US007920699B2

(12) United States Patent
Fujisaki et al.

(10) Patent No.: US 7,920,699 B2
(45) Date of Patent: Apr. 5, 2011

(54) ENCRYPTION OPERATING APPARATUS

(75) Inventors: Koichi Fujisaki, Kanagawa (JP);
Hideyuki Miyake, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 455 days.

(21) Appl. No.: 12/172,439

(22) Filed: Jul. 14, 2008

(65) Prior Publication Data

US 2009/0086962 A1 Apr. 2, 2009

(30) Foreign Application Priority Data

Jul. 19, 2007 (JP) ................................. 2007-188696

(51) Int. Cl.
*H04L 9/00* (2006.01)

(52) U.S. Cl. .......................................... 380/28; 713/400

(58) Field of Classification Search .................... 380/28; 713/168, 170, 171, 176, 200, 300, 400
See application file for complete search history.

(56) References Cited

U.S. PATENT DOCUMENTS

| 7,159,115 | B2* | 1/2007 | Fujisaki et al. ............... 713/171 |
| 7,278,034 | B2* | 10/2007 | Shipton ......................... 713/300 |
| 7,495,493 | B2* | 2/2009 | Ramaraju ...................... 327/211 |
| 7,639,712 | B2* | 12/2009 | Un et al. ........................ 370/469 |
| 7,770,008 | B2* | 8/2010 | Walmsley ...................... 713/170 |
| 7,783,886 | B2* | 8/2010 | Walmsley ...................... 713/176 |
| 2004/0193880 | A1* | 9/2004 | Walmsley ...................... 713/168 |
| 2004/0199786 | A1* | 10/2004 | Walmsley et al. ............. 713/200 |
| 2005/0204220 | A1* | 9/2005 | Yasuda et al. ................. 714/724 |
| 2007/0071235 | A1* | 3/2007 | Fujisaki et al. .................. 380/28 |
| 2007/0110053 | A1* | 5/2007 | Soni et al. ..................... 370/389 |

FOREIGN PATENT DOCUMENTS

| JP | 2005-165290 | 6/2005 |
| WO | WO 01/55821 A2 | 8/2001 |

\* cited by examiner

*Primary Examiner* — Joe H Cheng

(74) *Attorney, Agent, or Firm* — Oblon, Spivak, McClelland, Maier & Neustadt, L.L.P.

(57) ABSTRACT

Valid code data and invalid code data are alternately input to a register that fetches data synchronously with a clock signal. A state of a data value input to the register is monitored. Each time when it is determined that the data is stabilized by the valid code data, the register holds the valid code data.

11 Claims, 5 Drawing Sheets

FIG.3A
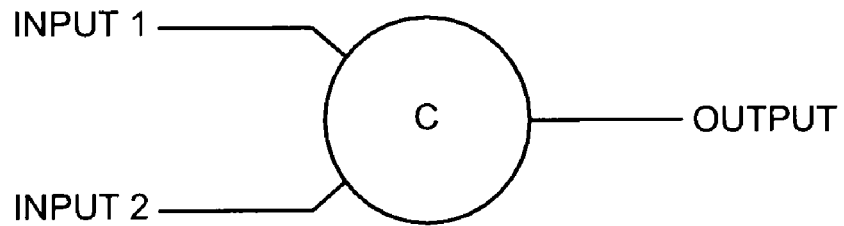
FIG.3B
| | | INPUT 1 | |
|---|---|---|---|
| | | 0 | 1 |
| INPUT 2 | 0 | 0 | * |
| | 1 | * | 1 |
FIG.4
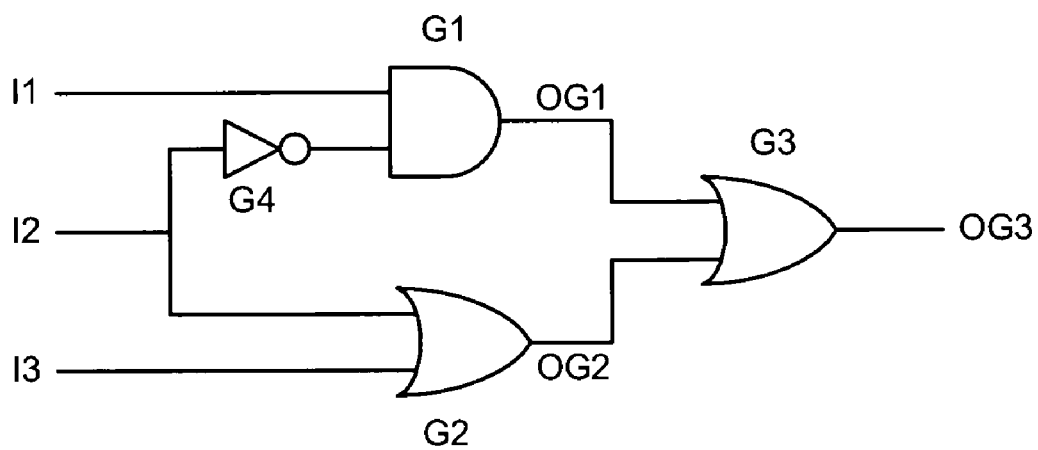

ENCRYPTION OPERATING APPARATUS

CROSS-REFERENCE TO RELATED APPLICATIONS

This application is based upon and claims the benefit of priority from the prior Japanese Patent Application No. 2007-188696, filed on Jul. 19, 2007; the entire contents of which are incorporated herein by reference.

BACKGROUND OF THE INVENTION

1. Field of the Invention

The present invention relates to an encryption operating apparatus that encrypts and decrypts data.

2. Description of the Related Art

As a technique of encryption or digital signature of message, a public key cryptography is used. Although the public key cryptography has a larger amount of operation than common key cryptography, when transmitting and receiving the enciphered message, there is an advantage that it is not necessary to share a key. Therefore, the public key cryptography is widely used and various methods are proposed, such as RSA cryptography, Rabin cryptography, ElGamal cryptography, and Elliptic curve cryptography.

In the public key cryptography, a user has a pair of cryptographic keys, a public key and a private key. A public key is widely distributed, while a private key is kept secret. For example, when a user A wishes to transmit a secret message to a user B, the user A encrypts the message using a public key of the user B, and transmits the encrypted message to the user B. The user B receives the encrypted message and can decrypt the encrypted message using an own private key corresponding to the public key. When the user A transmits a message to the user B by adding a digital signature to the message using an own secret key, the user B receives the message and verifies the added digital signature using the public key of the user A, thereby authenticating that the communication party is the user A.

According to an RSA encryption system, n(=pq) is generated from two distinct large random prime numbers p and q, and e is obtained to set a relationship of gcd(e,lcm(p−1, q−1))=1, where gcd is the greatest common divisor and lcm is the least common multiple. The system calculates d=e$^{-1}$ mod (lcm(p−1, q−1)), and sets e and n as public keys, and sets d as a private key. To decrypt the encrypted message or to sign a message using a private key, the Chinese Remainder Theorem (CRT) is generally used as a high-speed method of modular exponentiation. The CRT is explained below taking an example of a method of generating a signature S=M$^d$ modn for a message M.

Because a person who generates a digital signature knows two distinct large prime numbers p and q of n=pq, the person can calculate in advance values of the following equations (1) to (3).

$$d_p = d \bmod (p-1) \quad (1)$$

$$d_q = d \bmod (q-1) \quad (2)$$

$$a = q^{-1} \bmod p \quad (3)$$

When a message to be added with a signature is M, a signature S is generated by sequentially calculating the following relational equations (4) to (6).

$$M_p = M \bmod p, M_q = M \bmod q \quad (4)$$

$$S_p = M_p{}^{d_p} \bmod p, S_q = M_q{}^{d_q} \bmod q \quad (5)$$

$$S = S_q + (a \times (S_p - S_q) \bmod p) \times q \quad (6)$$

In the above equations (4) to (6), p and q with half a bit length of n are used as modulus of residue number arithmetic. Therefore, it is possible to encrypt or sign about three times faster than calculation using a modulus n.

Although this form allows faster decryption an signing by using CRT, it is less secure since it enable fault-based analysis. The fault-based analysis is an attack method of inducing faults, which means unexpected environmental conditions for example high temperature, unsupported supply voltage or current, excessively high overclocking and etc. to reveal their internal secret data. For instance, an attack method to RSA cryptography using CRT is explained.

By inducing faults, a malfunction occurs during the calculation of Sp in the above equation (5), and the value changes to a wrong value Sp' (≠Sp). A value S derived from the equation (6) also becomes a wrong value S' as shown in the following equation (7).

$$S' = S_q + (a \times (S_p' - S_q) \bmod p) \times q \quad (7)$$

It is clear that a difference between S' and S is expressed by the following equation (8) and becomes multiples of q. That is, because n=pq, q can be obtained by obtaining a greatest common divisor of S'−S and n (gcd(S'−S, n)=q).

$$S' - S = (a \times (S_p' - S_p) \bmod p) \times q \quad (8)$$

Conventionally, various techniques have been proposed as measures against the above attack method. For example, JP-A 2005-165290 (KOKAI) discloses the following technique. By calculating C=S$^{e'}$modn (e' is an inverse of the modulus p−1 of dp), a check calculation is performed to see whether C is equal to M. When a result of the check calculation is wrong, the calculation result is not output, thereby avoiding the offender from obtaining information containing the secret information.

However, the technique disclosed in JP-A 2005-165290 (KOKAI) has a problem in that modular exponentiation concerning the check process becomes additionally necessary and this takes time, although the technique can cope with a fault-based attack.

SUMMARY OF THE INVENTION

According to one aspect of the present invention, an encryption operating apparatus includes a register that fetches data from a data input line synchronously with a clock signal, and holds the fetched data as valid code data; a control circuit that monitors signals flowing through the data input line, and alternately outputs an enable signal and a disable signal for each time when the signals are stable; a selection output circuit that outputs a valid code data held in the register corresponding to the enable signal, and outputs invalid code data other than the valid code data corresponding to the disable signal; a combinational circuit that encrypts or decrypts the valid code data output from the selection output circuit, outputs the encrypted or decrypted data to the data input line, and outputs the invalid code data output from the selection output circuit to the data input line; and a clock filter that controls the clock signal corresponding to the enable signal or the disable signal output from the control circuit, wherein the control circuit outputs the disable signal when it is determined that the valid code data is input to the data input line, and outputs the enable signal when it is determined that the invalid code data is input to the data input line.

BRIEF DESCRIPTION OF THE DRAWINGS

FIG. 3A is a schematic diagram illustrating a C element;

FIG. 3B is a truth table illustrating the C element;

FIG. 4 is a schematic diagram for explaining the principle of generation of hazard;

DETAILED DESCRIPTION OF THE INVENTION

Exemplary embodiments of an encryption operating apparatus according to the present invention will be explained below in detail with reference to the accompanying drawings.

Figure 1:
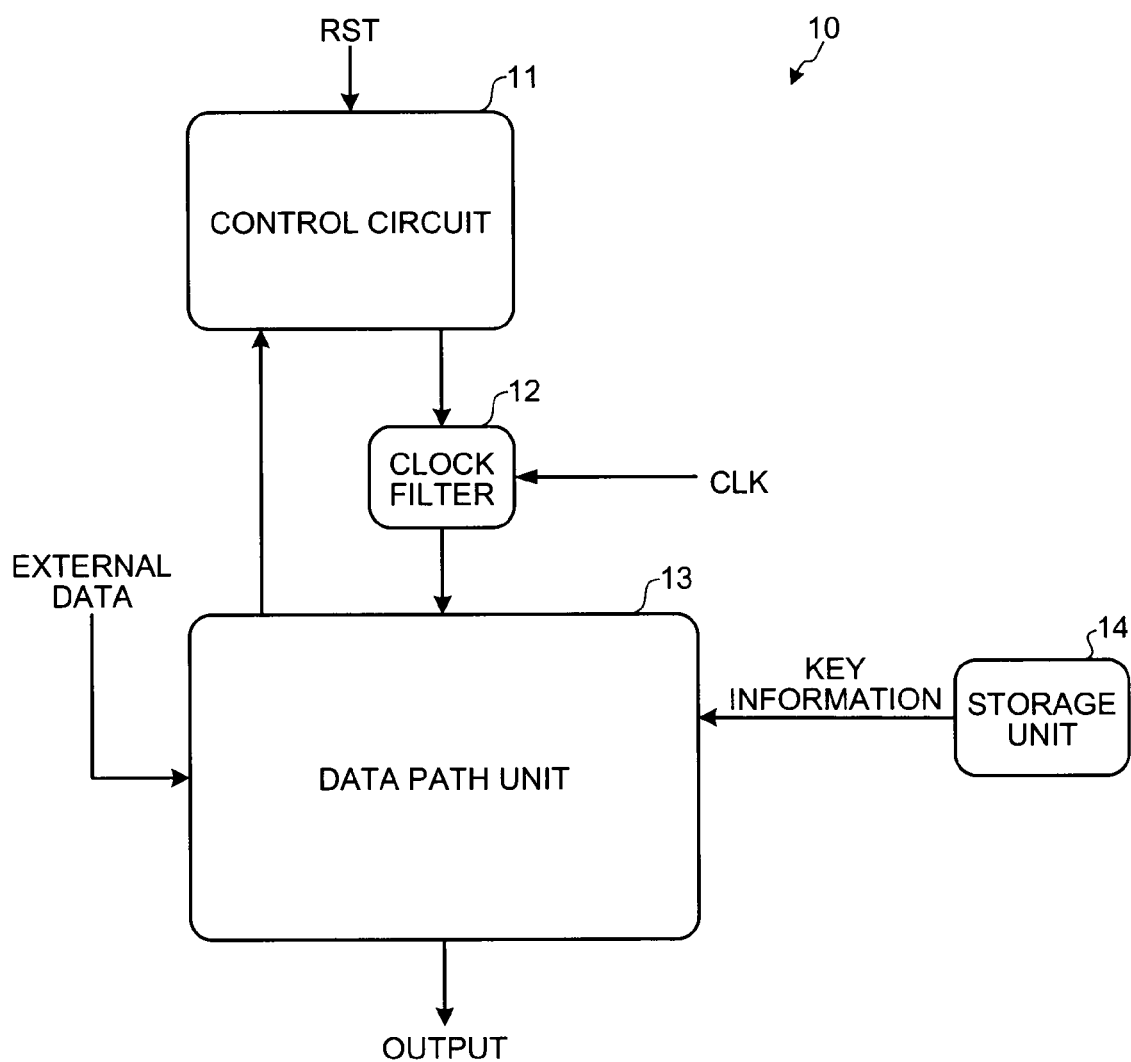
FIG. 1 is a block diagram of a configuration of an encryption operating apparatus according to a first embodiment of the present invention.
Figure 2:
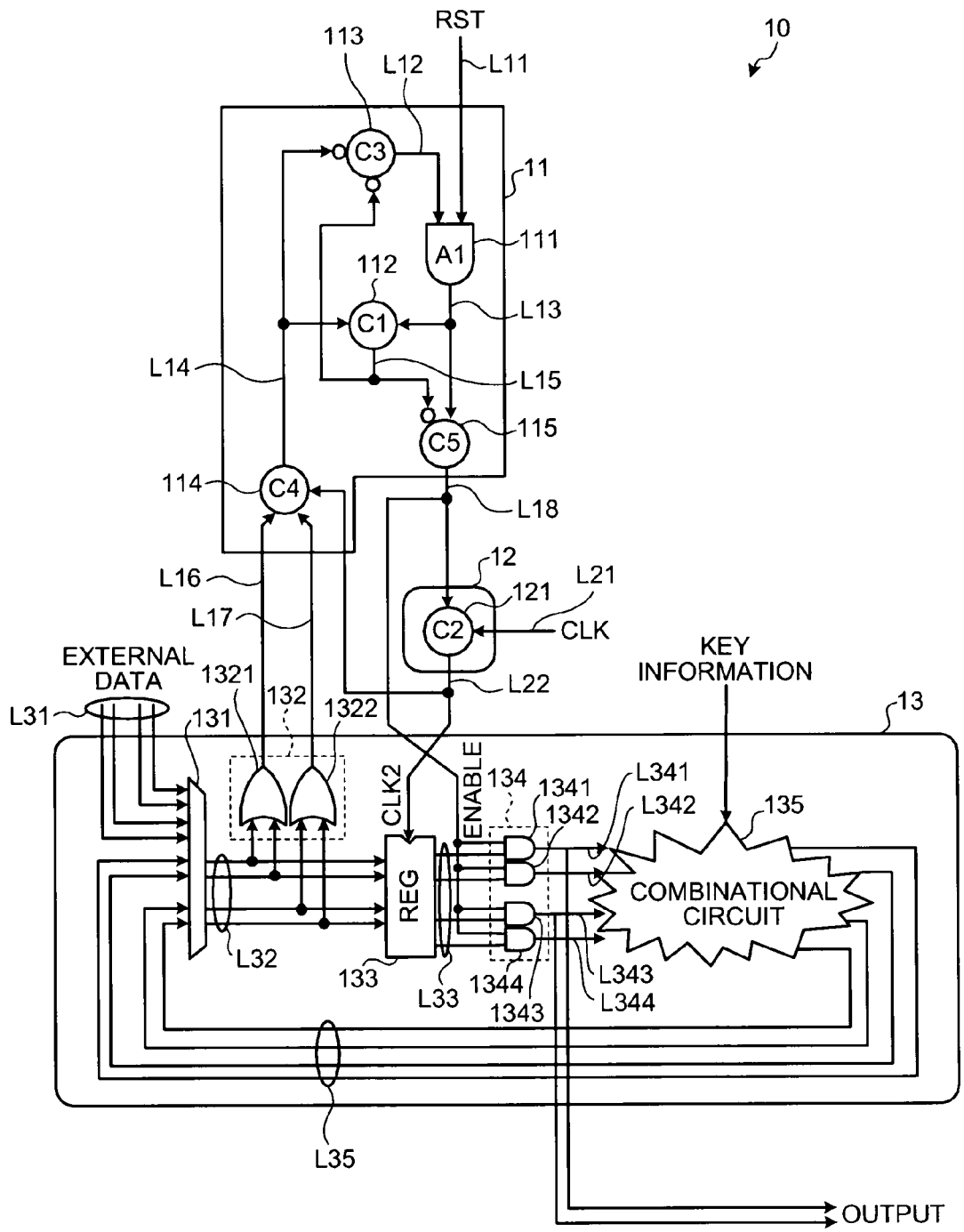
FIG. 2 is a diagram illustrating one example of a circuit configuration of the encryption operating apparatus shown in FIG. 1.

FIG. 1 is a block diagram schematically illustrating a configuration of an encryption operating apparatus 10 according to a first embodiment of the present invention. FIG. 2 is a diagram illustrating one example of a architecture of the encryption operating apparatus 10. The architecture of the encryption operating apparatus 10 is explained below with reference to FIGS. 1 and 2.

The encryption operating apparatus 10 includes a control circuit 11, a clock filter 12, a data path unit 13, and a storage unit 14.

The control circuit 11 is a state machine circuit that monitors a state of a data value flowing through a signal line L32, and changes a state of the data value output to the clock filter 12 and the data path unit 13 each time when the signals are determined to be stable. The "signals are stable" in this case mean that the data flowing through the signal line L32 is not in the course of being changed. More specifically, this means that conduction of valid code data or invalid code data described later through the signal line L32 has been confirmed. The control circuit 11 is explained below.

As shown in FIG. 2, the control circuit 11 includes an AND gate 111, and C elements 112, 113, 114, and 115. The C elements 112, 113, 114, and 115 are logic gates (Muller's C element) having a characteristic that an output does not change until when all values of input data become equal values. The C elements are explained in detail in, for example, Sequential Circuit Theory (1976) by Yoshihiro TOHMA, Shokodo Co., Ltd.

FIG. 3A schematically depicts a two-input one-output-type C element, as one example of the C element. FIG. 3B is a truth table of the C element shown in FIG. 3A.

As shown in FIG. 3B, only when the values of data (input signals) 1 and 2 input to input terminals of the C element become the same values, the data (output signals) output from the C element changes to this same value. A portion designated by "*" means that the value of output signal does not change from the data value of the last time.

Referring back to FIG. 2, the input terminal of the AND gate 111 is connected to an external device (not shown) via a signal line L11 and is also connected to an output terminal of the C element 113 via a signal line L12. From the signal line L11, a reset signal (RST) for instructing a reset of the control circuit 11 is input from an external device (not shown). The output terminal of the AND gate 111 is connected to the input terminal of the C element 112 and to the input terminal of the C element 115, via a signal line L13, respectively.

The input terminal of the C element 112 is connected to the output terminal of the AND gate 111 via the signal line L13, and is also connected to the output terminal of the C element 114 via a signal line L14. The output terminal of the C element 112 is connected to the input terminal of the C element 113 and to the input terminal of the C element 115, via a signal line L15, respectively.

The input terminal of the C element 113 is connected to the output terminal of the C element 114 via the signal line L14, and is also connected to the output terminal of the C element 112 via a signal line L15. The circles of these input terminals of C element 113 are called a bubble, and are generally used in circuit diagrams to indicate an inverted input. The output terminal of the C element 113 is connected to the input terminal of the AND gate 111 via the signal line L12.

The input terminal of the C element 114 is connected to the output terminal of an OR gate 1321 via a signal line L16, connected to the output terminal of an OR gate 1322 via a signal line L17, and connected to the output terminal of the clock filter 12 (a C element 121) via a signal line L22. The output terminal of the C element 114 is connected to the input terminal of the C element 112 and to the input terminal of the C element 113, via the signal line L14, respectively.

The input terminal of the C element 115 is connected to the output terminal of the AND gate 111 via the signal line L13, and is also connected to the output terminal of the C element 112 via the signal line L15. A data from the C element 112 is an inverted input. The output terminal of the C element 115 is connected to the input terminal of the clock filter 12 (the C element 121), and to the input terminal of an AND circuit 134 (AND gates 1341 to 1344), via a signal line L18, respectively.

The control circuit 11 alternately outputs an enable signal ("1") and a disable signal ("0") corresponding to data values input from the clock filter 12 and the data path unit 13, based on a logic operation by each of the above logic circuits. Specifically, when the reset signal is "1", and also when the data value "0" is input via the signal lines L16 and L17 and when the negate value "0" of a CLK2 signal is input from the clock filter 12, the control circuit 11 outputs the enable signal "1". When the reset signal is "1", and also when the data value "1" is input via the signal lines L16 and L17 and when the assert value "1" of the CLK2 signal is input from the clock filter 12, the control circuit 11 outputs the disable signal "0".

The clock filter 12 controls timing of the CLK signal input from the outside during an assert period ("1") and a negate period ("0"), based on a data value of the data output from the control circuit 11 (the C element 115), and outputs a result of the control as a CLK2 signal. The CLK signal input to the clock filter 12 is assumed to be generated by an external clock generation device (not shown). The clock filter 12 is explained below.

As shown in FIG. 2, the clock filter 12 includes the C element 121 having a characteristic similar to that of the C element 112 and the like. The input terminal of the C element 121 is connected to the output terminal of the C element 115, and the signal line L21 to which the CLK signal is input, via the signal line L18, respectively. The output terminal of the C element 121 is connected to the input terminal of the C element 114 and to the control input terminal of a register 133, via the signal line L22, respectively.

The clock filter 12 changes the output CLK2 signal from "0" to "1", only when the data value from the control circuit 11 is "1" and also when the CLK signal is "1", based on the logic operation of the C element 121. Similarly, the clock filter 12 changes the output CLK2 signal from "1" to "0", only when the data value from the control circuit 11 is "0" and also when the CLK signal is "0".

The data path unit 13 encrypts or decrypts data (external data) input from the outside, using key information (private key or public key) stored in the storage unit 14, and outputs a result of the encryption or decryption to the outside. The external data input by the data path unit 13 can be a plain text or encrypted data encrypted by a predetermined encryption system.

As shown in FIG. 2, the data path unit 13 includes a selector 131, an OR circuit 132, the register 133, the AND circuit 134, and a combinational circuit 135. Connection lines for connecting each circuit within the data path unit 13 are connected in the unit of four lines, and one-bit data is expressed using each two signal lines.

The selector 131 selectively changes over any one of the external data input via a signal line L31 from an external device (not shown), and the output data of the combinational circuit 135 input via a signal line L35, and outputs the selectively-changed data to the signal line L32.

Specifically, the selector 131 selectively changes over data to be output, corresponding to a changeover signal input from the external device (not shown), and outputs any one of the data to the signal line L32. In the first embodiment, it is assumed that the external data to be encrypted or decrypted is output to the signal line L32 in the state of being encoded into valid code data described later, and the data is latched in advance by the register 133.

The OR circuit 132 includes OR-type logic gates (OR gates 1321 and 1322). Two signal lines out of the four signal lines L32 are connected to the input terminals of the OR gates 1321 and 1322, respectively. The output terminals of the OR gates 1321 and 1322 are connected to the input terminals of the C element 114 via the signal lines L16 and L17, respectively.

The register 133 is a temporary storage device that fetches data (valid code data) input via the signal line L32, and latches the data, when the value of the CLK2 signal input from the clock filter 12 is assert (1). The data latched by the register 133 is output to the AND circuit 134 via a signal line L33.

The AND circuit 134 includes AND gates (AND gates 1341 to 1344). Each input terminal of the AND gates 1341 to 1344 is connected with each one line of the four signal lines constituting the signal line L33, and is connected with the signal line L18 connected to the control circuit 11 (the C element 115). It is assumed that each one of the pair of signal lines expressing one bit is connected to each of the AND gates forming a pair, out of the AND gates 1341 to 1344.

The output terminals of the AND gates 1341 to 1344 are connected to the combinational circuit 135 via the signal lines L341 to L344, respectively. Data output from the AND gates 1341 to 1344 are structured such that two AND gates forming a pair express one bit data.

The data output from the AND gates 1341 to 1344 are output to the combinational circuit 135 via the signal lines L341 to L344, respectively. Out of the AND gates 1341 to 1344, outputs from two AND gates forming a pair express one bit data. In the first embodiment, out of the data output from the AND circuit 134, the data becoming (0, 0), that is, the data output from the two AND gates forming a pair all becoming "0" are set as invalid code data.

Data values output from the AND gates 1341 to 1344 are determined by the data value input from the control circuit 11 via the signal line L18. That is, when the data value output from the control circuit 11 is "0", the invalid code data is output to the combinational circuit 135. When the data value output from the control circuit 11 is "1", data latched by the register 133 is output to the combinational circuit 135 as valid code data.

The combinational circuit 135 is a hazard-free combinational circuit. The "hazard" is explained below with reference to FIGS. 4 and 5. The hazard-free combinational circuit guarantees that a transition from "0" to "1" on the signal line L32 occurs only at most once and therefore a transition of the OR gates 1321 and 1322 outputs occur only at most once in a clock cycle.

Figure 5:
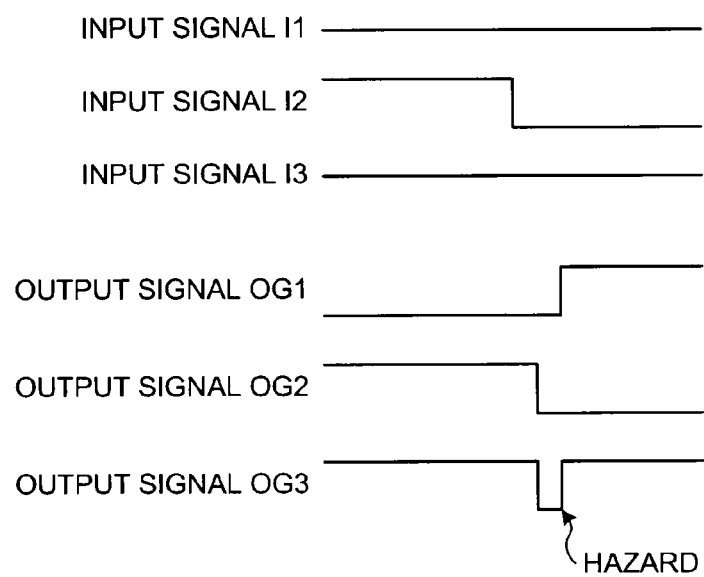
FIG. 5 is a timing chart of a relationship between input signals input to circuits shown in FIG. 4, and output signals output from the circuits.

FIG. 4 is a circuit diagram for explaining the principle of generation of hazard. FIG. 5 is a timing chart of a relationship between input signals I1, I2, and I3 input to circuits (an AND gate G1, and OR gates G2 and G3) shown in FIG. 4, and output signals OG1, OG2, and OG3 output from the circuits.

In FIG. 4, G1 denotes an AND gate, G2 denotes an OR gate, G3 denotes an OR gate, and G4 denotes a NOT gate. The input signals I1 to I3 externally input are output as an output signal OG3 from G3, via G1, G2, and G4.

As shown in FIG. 5, consider an example that when the input signal I1 is "0" and also when the input signal I3 is "1", the input signal I2 changes from "1" to "0". In this case, when there is no occurrence of a signal delay or a gate delay, the output signal OG3 of the OR gate G3 does not change from "1". However, actually, a delay occurs when a signal passes through the signal line and the logic gate. Therefore, when the output signals OG1 and OG2 of the AND gate G1 and the OR gate G2 change, this affects the output signal OG3 of the OR gate G3 in some cases.

For example, when it is assumed that a circuit only has a gate delay, a change of the output signal OG1 of the AND gate G1 is slightly delayed from a change of the output signal OG2 of the OR gate G2, because of the presence of the NOT gate G4. Therefore, the output signal OG3 of the OR gate G3 momentarily changes from "1" to "0" to "1" as shown by an arrowhead in FIG. 5. A momentary change of a signal value due to a wiring delay or a gate delay like this is called hazard. In this case of a combinational circuit having hazard like this, whether the output of the circuit is stabilized or not is difficult to determine based on only the value of the output signal line. By providing the combinational circuit 135 as a hazard-free circuit, the OR gates 1321 and 1322 can monitor whether the output of the combinational circuit 135 is stabilized. A method of designing a hazard-free circuit is explained in detail in, for example, Sequential Circuit Theory (1976) by Yoshihiro TOHMA, Shokodo Co., Ltd.

In the first embodiment, invalid code data and valid code data are alternately input to the combinational circuit 135 by the control of the control circuit 11. Accordingly, the control circuit 11 can determine that the data flowing to the signal line L32 is stabilized, that is, either the invalid code data or the valid code data flows to the signal line L32, based on the operation result of the OR circuit 132. The reasons for this are explained below.

First, when the data output from the control circuit 11 is "0", all the outputs from the AND gates 1341 to 1344 become "0", and invalid code data (0,0) is input to the combinational circuit 135. As a result, the invalid code data is output to the selector 131 from the combinational circuit 135. In this case, the outputs of the OR gates 1321 and 1322 become "0", and these data are input to the C element 114. And the control circuit 11 can confirm that the invalid code is arrived to the signal line L32.

Next, the output from the control circuit 11 becomes "1", and the data (the valid code data) latched by the register 133 is input to the combinational circuit 135 via the AND circuit 134. The combinational circuit 135 outputs a result of the operation to the selector 131 via the signal line L35. In this case, because the combinational circuit 135 is a hazard-free circuit, the output data is changed only once from (0, 0) to (0, 1) or (1, 0). That is, when the output value of the OR circuit 132 monitoring the value of the data input to the register 133 becomes "1", this means that the result of the operation by the combinational circuit 135 is prepared as the input to the register 133.

As described above, the output signal of the combinational circuit 135 is initialized by inputting the invalid code data, and thereafter, the valid code data is input. By repeating a series of the above operation, it can be sequentially confirmed whether the valid code data is input to the register 133.

When the invalid code data is not input, the combinational circuit 135 always outputs the valid code data. Therefore, the control circuit 11 cannot determine whether the value of the signal input to the register 133 is a correct value or whether the value is in the middle of a change. Consequently, even when an operation error occurs during the encryption or decryption operation, the operation error cannot be found. On the other hand, in the first embodiment, based on the configuration as described above, it can be determined that the input data to the register 133 is in the stable state. As a result, occurrence of an operation error during the operation can be prevented beforehand.

The encryption operating apparatus 10 uses the clock filter 12, thereby making it possible to input the CLK signal from the outside only when the signal line of the data path unit 13 is stable. That is, the clock filter 12 can prevent a latch of a value different from the original calculation result due to a rising of the CLK2 signal before the input signal to the register 133 is stabilized which becomes a cause of a malfunction. The operation of the clock filter 12 is explained below.

To normally operate the encryption operating apparatus 10, the CLK signal needs to be input while the input signal to the register 133 is stable. Therefore, in the encryption operating apparatus 10, the externally input CLK signal is controlled to be input only when the signal line of the data path unit 13 is stable, by using the C element 121 of the clock filter 12.

Specifically, the output signal from the control circuit 11 is changed each time when the input data to the register 133 is stable as the valid code data or the invalid code data. Therefore, this input data is used as the input data to the C element 121. Regarding the output signal of the control circuit 11, the output from the clock filter 12 does not change, even when the CLK signal from the outside changes from "0" to "1" or from "1" to "0", when the input signal to the register 133 is not stable. That is, the CLK2 signal output from the clock filter 12 changes to "0" or "1" only when the input data to the register 133 is stable, regardless of the frequency of the input CLK signal.

Therefore, even when the CLK signal is operated by an attacker, the control circuit 11 and the clock filter 12 operate to change the CLK2 signal only when the input data to the register 133 is stabilized. As a result, a circuit configuration that does not latch a value causing the register 133 to generate malfunction can be provided.

Figure 6:
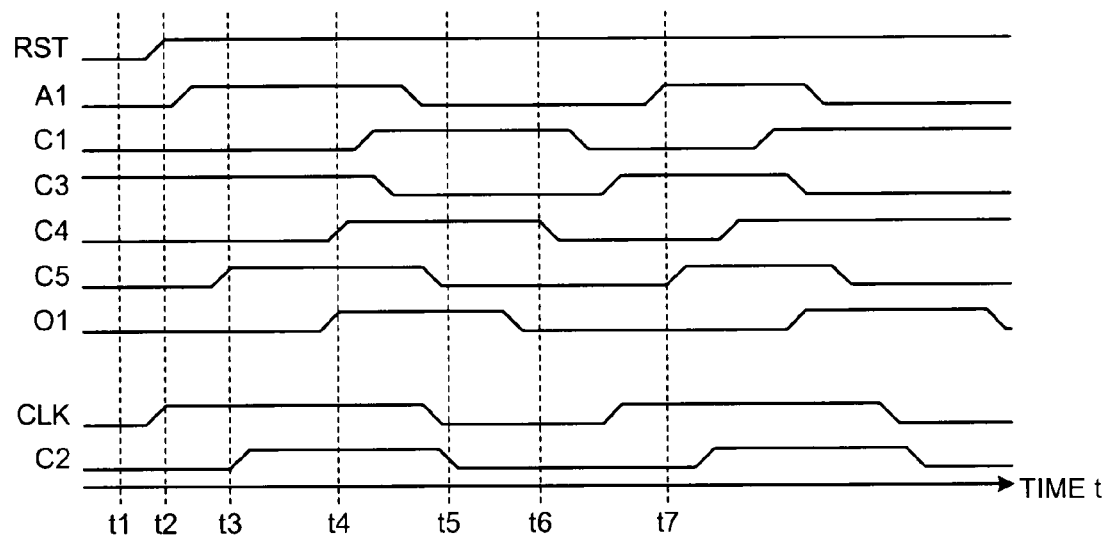
FIG. 6 is a timing chart of an operation of a control circuit.

FIG. 6 is a timing chart for explaining the operation of each logic gate of the control circuit 11. In FIG. 6, RST denotes a reset signal, A1 denotes an output signal of the AND gate 111, C1 denotes an output signal of the C element 112, C2 denotes an output signal of the C element 121, C3 denotes an output signal of the C element 113, C4 denotes an output signal of the C element 114, C5 denotes an outputs signal of the C element 115, and O1 denotes an output signal of the OR circuit 132. CLK denotes a CLK signal input from the outside to the C element 121.

A value of the reset signal for initializing the encryption operating apparatus 10 is "0" at time t1. At time t2 when the input signal to the register 133 is stabilized to the invalid code data (0, 0), the reset signal becomes "1", and the output data of the AND gate 111 changes to "1". Following this change, the output data of the C element 115 becomes "1" (enable), and the data held in the register 133 are input to the combinational circuit 135 via the AND circuit 134.

The output signal of the OR circuit 132 becomes "1", and the control circuit 11 detects that the input signal to the register 133 is the valid code data and is stable. Further, as the CLK signal is "1" at time t2 afterwards, the output data of the C element 121 in the clock filter 12, that is, the CLK2 signal, rises at time t3 and becomes "1". At time t4, the output data of the C element 114 becomes "1", and the output data of the C element 112 changes to "1". The output data of the C element 113 then changes to "0", and the output data of the AND gate 111 becomes "0" accordingly. At time t5, the output data of the C element 115 changes to "0" (disable). Consequently, all inputs to the combinational circuit 135 become the invalid code data (0, 0).

As a result, at time t6, the output data of the C element 114 becomes "0", the output data of the C element 112 becomes "0", and the output data of the C element 113 becomes "1". When the output data of the C element 113 becomes "1", the output of the AND gate 111 becomes "1" at time t7, and the output data of the C element 115 becomes "1" (enable). Thereafter, a similar operation is repeated, and the invalid code data and the valid code data alternately flow to the combinational circuit 135.

As described above, according to the first embodiment, the CLK signal is controlled corresponding to the value of the data flowing through the signal line L32. Accordingly, only when the data input to the register 133 is the valid code data, the data can be held in the register 133. Because the fault-based analysis attack to the CLK signal can be prevented beforehand by this arrangement, the countermeasure of fault-based attack can be improved without performing a check process of a detection of a malfunction.

A second embodiment of the present invention is explained next. In the first embodiment, the encryption operating apparatus 10 capable of detecting a fault-based analysis attack to the CLK signal is explained. In the second embodiment, an encryption operating apparatus 20 capable of detecting a fault-based analysis attack applied with an unsupported supply voltage of a power source voltage equal to 0 volt or equal to or higher than a rated voltage is explained.

Figure 7:
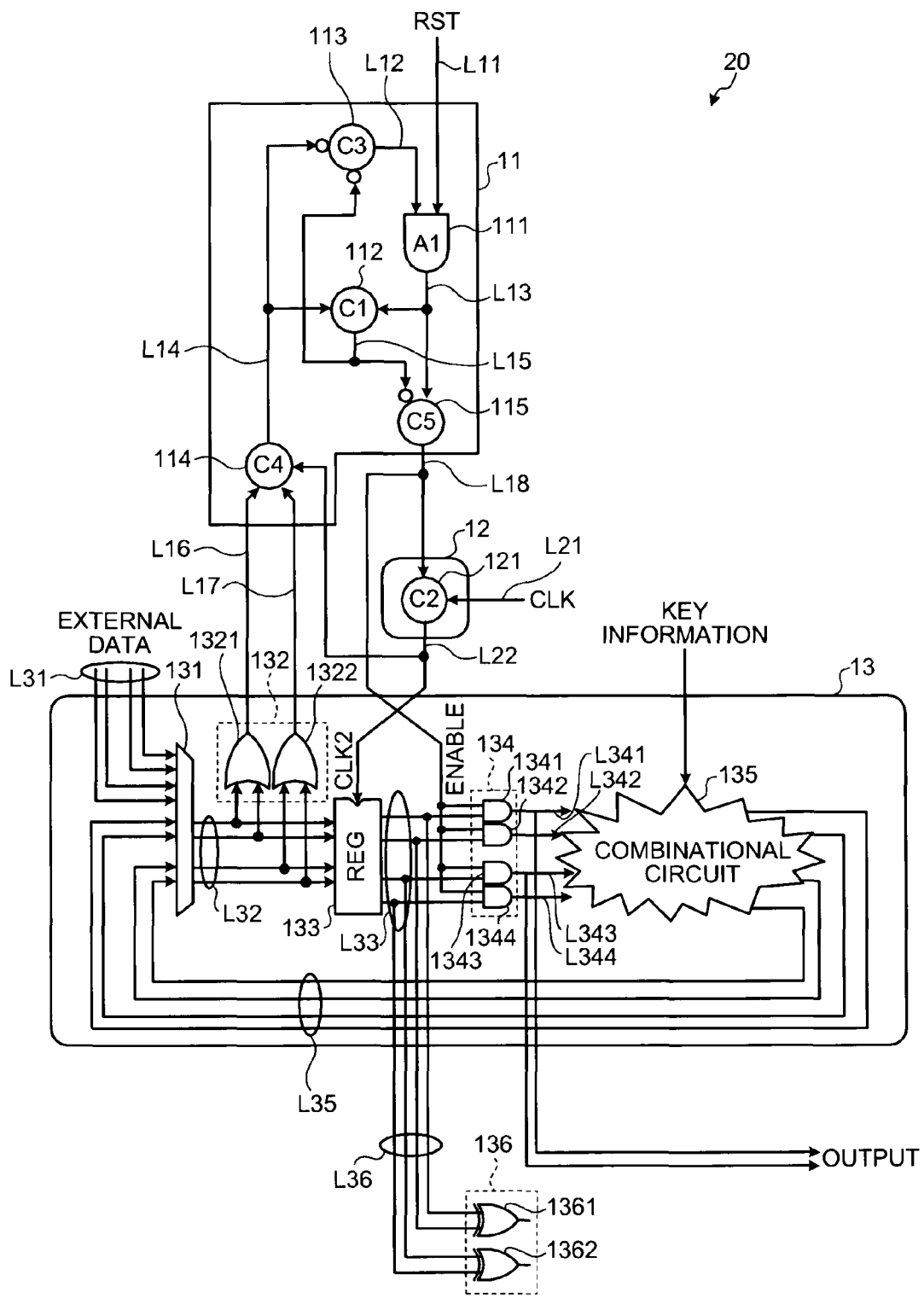
FIG. 7 is a diagram illustrating one example of a circuit configuration of an encryption operating apparatus according to a second embodiment of the present invention.

FIG. 7 is one example of a circuit configuration of the encryption operating apparatus 20 according to the second embodiment. A schematic configuration of the encryption operating apparatus 20 is similar to that shown in FIG. 1, and therefore, depiction of the schematic configuration will be omitted. Explanations of members similar to those in the first embodiment will be also omitted.

As the fault-based analysis attack that applies disturbance to the power source voltage, there are considered a method of setting the power source voltage to 0 volt or applying unsupported supply voltage. In the former case, an offender sets the power source voltage to 0 volt, thereby setting the data latched by the register 133 to (0, 0), that is, the invalid code data, and inducing a malfunction of the encryption operating apparatus 10. In the latter case, the offender applies a voltage equal to or higher than a rated voltage to the power source voltage, thereby setting the data latched by the register 133 to (1, 1), and inducing a malfunction of the encryption operating apparatus 10. That is, (0, 0) and (1, 1) are invalid data that are not basically latched by the register 133.

Therefore, the encryption operating apparatus 20 includes a detecting circuit 136 that monitors the value of the data flowing through the signal line L33, and detects that invalid data other than the valid code data is latched by the register 133. The detecting circuit 136 is explained below.

As shown in FIG. 7, in the encryption operating apparatus 20 according to the second embodiment, a signal line L36 is connected to each signal line L33, and a data value latched by the register 133 via the signal line L36 is input to the detecting circuit 136.

The detecting circuit 136 includes XOR gates (1361 and 1362). Data values flowing through two signal lines becoming a pair of the signal lines L33 are input to the input terminals of the XOR gates 1361 and 1362. Detection of the invalid data is performed based on the data values output from the XOR gates 1361 and 1362.

Specifically, when the invalid data (0, 0) and (1, 1) are latched by the register 133, the XOR gate 1361 (or the XOR gate 1362) outputs the data value "0". Therefore, when "0" is output from the detecting circuit 136, it can be determined that an error occurs in the data path unit 13 (the encryption operating apparatus 20).

As described above, according to the second embodiment, even when a fault-based analysis attack applying disturbance to the power source voltage is performed, invalid data can be detected based on the data value latched by the register 133. Therefore, fault-based attack proof can be improved without performing a check process of detection of the invalid operation.

In the second embodiment, while the mode of using the XOR gates as a detecting circuit is explained, other mode can be also used. For example, the invalid data (0, 0) can be detected using an NOR gate, and the invalid data (1, 1) can be detected using a NAND gate.

While exemplary embodiments of the present invention have been explained above, the present invention is not limited thereto, and various modifications, substitutions, and additions can be made without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encryption operating apparatus comprising:
    a register that fetches data from a data input line synchronously with a clock signal, and holds the fetched data as valid code data;
    a control circuit that monitors signals flowing through the data input line, and alternately outputs an enable signal and a disable signal for each time when the signals are stable;
    a selection output circuit that outputs a valid code data held in the register corresponding to the enable signal, and outputs invalid code data other than the valid code data corresponding to the disable signal;
    a combinational circuit that encrypts or decrypts the valid code data output from the selection output circuit, outputs the encrypted or decrypted data to the data input line, and outputs the invalid code data output from the selection output circuit to the data input line; and
    a clock filter that controls the clock signal corresponding to the enable signal or the disable signal output from the control circuit, wherein
    the control circuit outputs the disable signal when it is determined that the valid code data is input to the data input line, and outputs the enable signal when it is determined that the invalid code data is input to the data input line.

2. The apparatus according to claim 1, wherein the clock filter controls an assert period and a negate period of an external clock signal input from outside, corresponding to the enable signal and the disable signal, respectively, thereby setting the clock signal.

3. The apparatus according to claim 2, wherein the clock filter changes the clock signal to the assert period only when the external clock signal is in the assert period and also when the enable signal is output, and changes the clock signal to the negate period only when the external clock signal is in the negate period and also when the disable signal is output.

4. The apparatus according to claim 1, wherein the clock filter has a logic gate that does not change an output data value until when all input values coincide with each other.

5. The apparatus according to claim 1, wherein the control circuit outputs the disable signal when it is determined that the valid code data is input to the register.

6. The apparatus according to claim 5, further comprising an OR circuit that calculates a logical sum of data values input to the register, wherein
    the control circuit determines whether the valid code data flows through the data input line based on an operation result of the OR circuit.

7. The apparatus according to claim 6, wherein, for each time when the operation result of the OR circuit coincides with a data value of a clock signal output from the clock filter, the control circuit outputs a data value having an inverted value of the data value as the enable signal or the disable signal.

8. The apparatus according to claim 6, wherein the control circuit has a logic gate that does not change an output data value until when all input values coincide with each other.

9. The apparatus according to claim 1, further comprising a detecting circuit that logically calculates a data value output from the register, and detects that the invalid code data is held in the register based on the calculated result.

10. The apparatus according to claim 1, wherein the data input line has a plurality of signal lines, and
    encoded data flows so as to express one-bit data through for each two signal lines forming a pair, from the plurality of signal lines.

11. The apparatus according to claim 1, wherein the combinational circuit is a hazard-free circuit.

* * * * *